UNITED STATES PATENT OFFICE 3,374,703
Patented Mar. 26, 1968

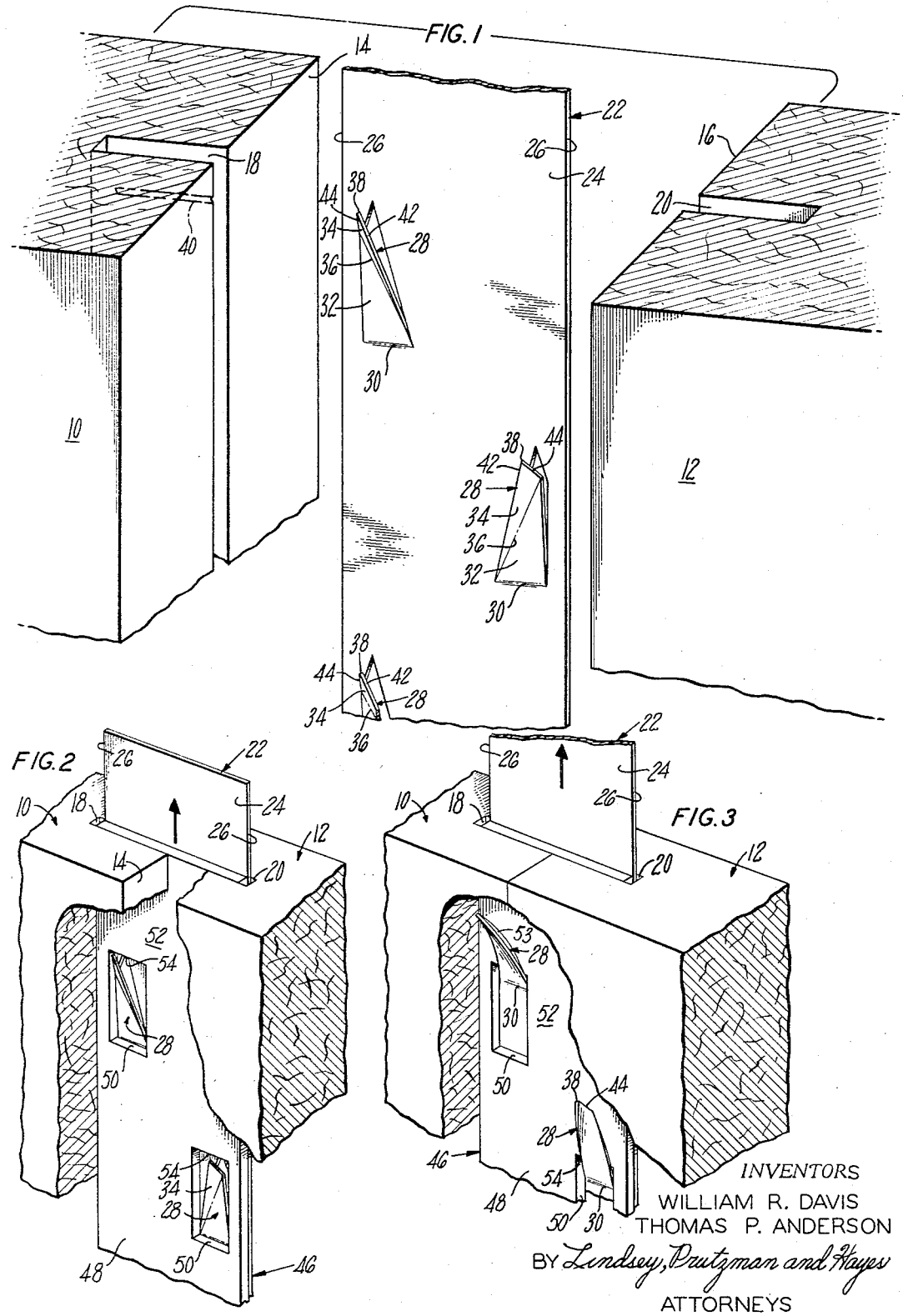

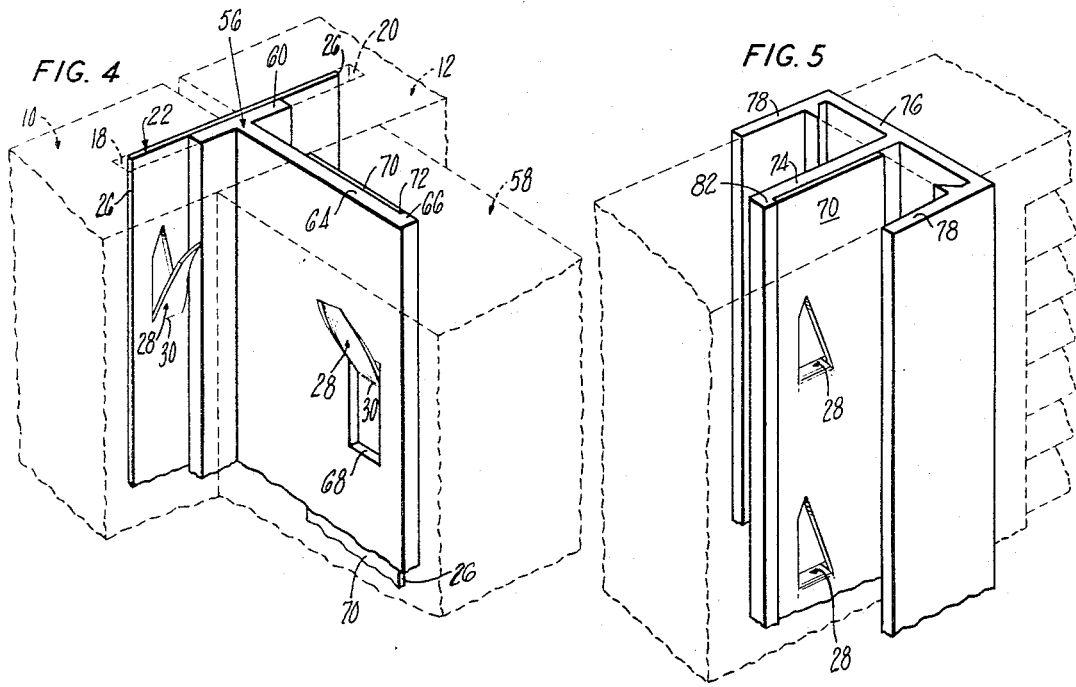
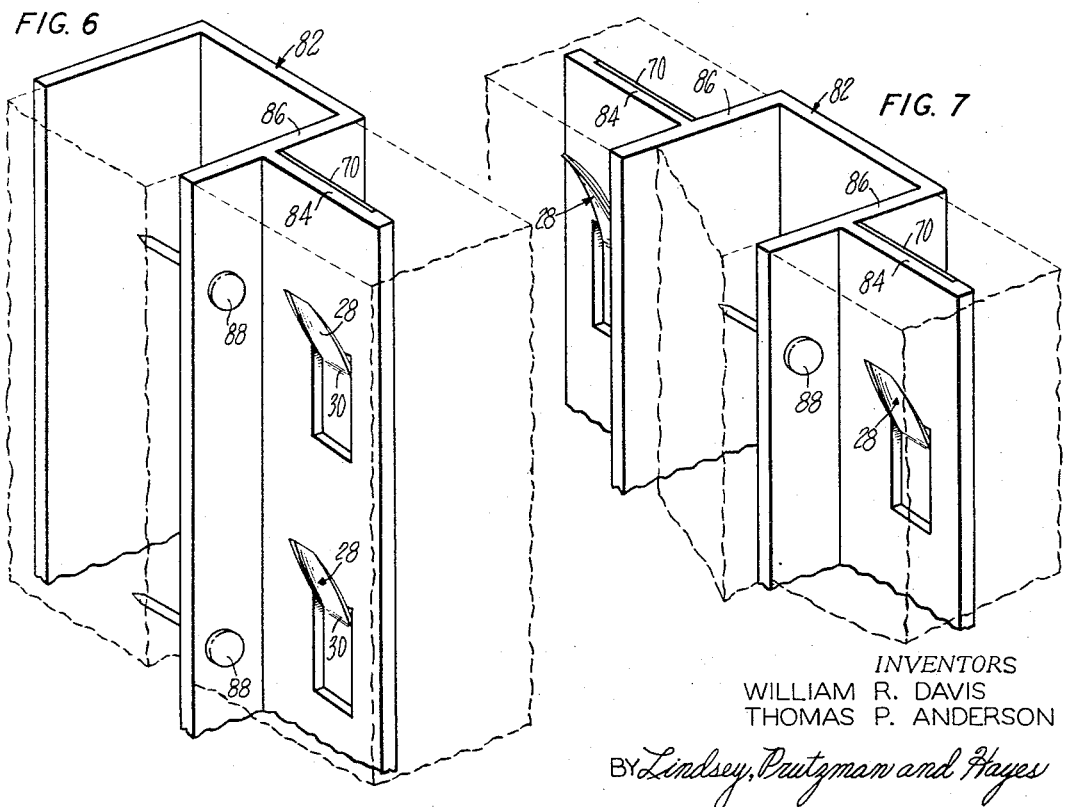

3,374,703
FASTENERS AND FASTENER ASSEMBLIES FOR BUILDING PANELS AND THE LIKE
William R. Davis, West Simsbury, Conn., and Thomas P. Anderson, Palatine, Ill., assignors to The Stanley Works, New Britain, Conn., a corporation of Connecticut
Filed Dec. 1, 1965, Ser. No. 510,785
11 Claims. (Cl. 85—13)

ABSTRACT OF THE DISCLOSURE

Spline fastener assemblies for joining building panels comprise a metal strip having biangularly deformed fastening teeth and may include a spacer strip having windows in registry with the teeth for camming the teeth into the panels during longitudinal displacement of the strip. The fastening teeth twistingly impregnate the panels due to their biangular configuration while applying a closing force on the panels. The spacers may include frame portions of various designs to provide a neat finished appearance.

The present invention relates to fasteners and fastener assemblies suitable for use with building panel members and the like. More particularly it relates to spline-type fasteners having special usefulness in assembling friable building panels having elongated slots in the surfaces thereof to be joined.

A principal object of the present invention is to provide a new and improved fastener of the type described adapted for assisting in the quick and facile assemblage of friable panel units into a rigid assembly in a secure, self-closing, and self-locking manner.

Another object of the present invention is to provide a new and improved spline fastener suitable for use with friable core panel material, which fastener exhibits a strong and sturdy configuration, resists undesirable separation of panels assembled therewith, and substantially uniformly distributes joint loading throughout the entire length of the fastener.

Still another object of the present invention is to provide a new and improved fastener of increased strength and durability which presents a greater retaining area between the coacting portions of the fastener and the panel thereby resisting tension failure of the coacting portions due to the fastener cutting through the core material.

A further object of the present invention is to provide a new and improved fastener of the type described adapted for manufacture from thin gauge sheet stock material for joining members having enlarged elongated slots while at the same time providing substantial joint rigidity and a flush, clean, and smooth appearance to the assembled panel members due to its ability to create a closing force on the panels being joined.

It is a still further object of the present invention to provide a new and improved fastener assembly capable of use with door and window panels, corner sections, and interior dividing sections which can be rapidly and securely installed in a manner which continuously acts to maintain the integrity of the construction.

A still additional object of the present invention is to provide a new and improved fastener assembly of the type described suitable for use with building panels and the like which coacts to more firmly and positively drive the binding portions of the fastener into cooperative retention with the panel while at the same time providing repeatedly accurate alignment of the panel members and a neat dressed appearance to the otherwise raw panel edges of corner panels, all of the joints being completely hidden.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is an exploded isometric view, partially broken away and partially in section, of a panel joint incorporating an embodiment of the fastener of the present invention;

FIG. 2 is a perspective view, partially broken away and partially in section, of an embodiment of the fastener assembly of the present invention during an intermediate stage of joint formation;

FIG. 3 is a view similar to FIG. 2 showing the fastener assembly subsequent to completion of the joint; and FIGS. 4, 5, 6, and 7 are perspective views similar to FIG. 3 showing other embodiments of the fastener assembly of the present invention.

In general the fastener assemblies of the present invention comprise a fastener strip of sheet metal or the like carrying integral biangularly deformed teeth protruding therefrom which, upon longitudinal displacement of the strip within the kerf of a building panel, cut a twisting, panel-closing path into the panel thereby loading the teeth and applying a closing force to the panels being fastened. The assembly may additionally include an apertured spacer which cams the fastening teeth into the panels in a more pronounced manner. As shown in FIGS. 5–7 the spacer may be formed as part of a frame for window and door panels, corner sections, and foundation, floor, wall and ceiling panels.

Referring now to the drawings in greater detail wherein like reference characters indicate like parts throughout the several figures, there is shown in FIG. 1 a pair of building panels 10, 12 constructed of friable core material or the like and having opposed contiguous end faces 14, 16 positioned for end-to-end assemblage. The faces are each provided with narrow, longitudinally extending, substantially straight slots or kerfs 18, 20, respectively, in aligned relationship intermediate the exposed faces of the respective panels. A fastener generally designated 22 and hereinafter referred to as a spline is shown positioned between the panels 10, 12 and adjacent the kerfs for ready insertion therein. The spline 22 is a thin, flat member comprising an elongated, generally rectangular body portion 24, preferably made of sheet stock spring steel or the like, carrying a row of integral teeth adjacent each of its elongated, longitudinally extending, parallel edges 26. The spline body 24 has a thickness substantially less than the width of the kerfs 18, 20 and a width slightly less than their combined depths. Thus, it can be readily received within the kerfs when forming the desired joint connection. Also, as can be appreciated, the faces 14, 16 of the panels can be placed in firm and intimate abutting contact upon initial assemblage thereby permitting inspection of the assembly prior to the secure joining thereof by longitudinal displacement of the spline within the kerfs.

The teeth 28 within each row are longitudinally spaced therealong and extend outwardly from the body 24 for contacting the sides of the kerfs upon initial assemblage of the joint. In accordance with the preferred embodiment of the invention the rows of teeth are located adjacent the edges 26 of the spline body but the teeth in each row are offset or staggered longitudinally thereby increasing the effective cross-sectional strength of the body portion over that of conventional splines having laterally aligned pairs of teeth. The teeth are integral with the body and are formed by cutting or piercing the spline body and deforming or bending outwardly from the body the individual teeth 28. The teeth may be formed as projections on only one side of the spline body, as illustrated, or they may extend outwardly from both sides thereof.

As shown, the teeth 28 take the form of generally triangular sheet metal portions integral with the body along only one edge of the tooth and extend outwardly therefrom in a biangular manner. In a spline where longitudinal displacement thereof effectuates setting of the joint, the tooth edge integral with the body is the base edge 30 of the triangular tooth and extends transversely of the longitudinal center line and parallel edges 26 of the body. The teeth extend longitudinally and outwardly from the base 30 and include a flat, generally triangular base portion 32 and an angularly disposed tab portion 34, each offset from the spline body 24 at a different acute angle thereto. The tab 34 extends outwardly from the tooth base on the side thereof away from the body edge 26 which is first to enter the kerf. It is integral with the base along the entire length of fold edge 36 thereof and contains a leading cutting tip 38. The generally triangular tab 34 is disposed at an acute angle to the tooth base 32, the angle being substantially greater than the angle between the tooth base and the body of the spline; for example, a tab angle of approximately 45 degrees may be used in conjunction with a tooth base angle of only 4 degrees. In any event the tip 38 should extend outwardly from the spline body 24 a sufficient distance so that upon insertion of the spline into the kerf the tip will dig into the friable core material of the panel causing a small groove therein, as shown by phantom lines 40 of FIG. 1. Additionally, the free edges 42, 44 of the tab which define the cutting tip 38, are initially cut at substantially the same angle relative to the edge 26 of the spline body, e.g. about 15 degrees. The relatively small angle of protrusion of the tooth base together with the tapering tab edge 44 permits the ready insertion of the spline into the kerf without substantially deforming the tooth. At the same time the cutting tip 38 is positioned in cooperative relationship with the side of the kerf so as to coact therewith upon longitudinal displacement of the spline.

Assemblage of the spline within the kerfs can be readily effectuated by first pressing the spline into the kerf of one of the panels causing the cutting tips 38 of the teeth to cut the small grooves 40 into the readily friable core material. As will be appreciated, approximately half of the spline 22 remains exposed and is ready to receive the other panel. Thereupon it is possible to examine the assembled joint prior to the completion of the joining operation in order to assure proper fit and alignment of the abutting panels. If the alignment and other considerations appear satisfactory the joining operation is continued by longitudinally displacing the spline within the kerfs. Upon displacement of the cutting tips 38 readily dig into the core material cutting a path therein and causing the teeth to pull away from the plane of the spline body. It will of course be appreciated that the total longitudinal displacement of the spline during the joining operation is no more than the length of the teeth being set within the core material. Because of the angular relationship between the tab 34 and the tooth base 32, the tooth tends to twist as it is driven into the friable core interior and assumes a position wherein a greater surface area of the tooth resists the separation of the joined panels, the degree of twist depending on the angular relationship between the tab and the plane of the spline body. At the same time as the arcuate setting of the teeth there is produced a closing force on the panels which continues during the entire joint securing operation thereby providing a firm and tight joint. Also, a greater amount of friable core material is loaded onto the twisting teeth and firmly and securely sets the teeth within the member so as to prevent separation therebetween.

Referring now to the remainder of the drawings and in particular to FIGS. 2 and 3 thereof, there is shown an embodiment of a fastener assembly, generally designated 46, which aids and enhances the joint setting or securing action of the spline. The assembly includes, in addition to the spline 22 described hereinbefore, a thin, flat plate member or strip 48 of substantially the same rectangular configuration as the spline 22 and used in conjunction therewith within the kerfs 18, 20 of the panels. The strip 48 is of a thickness approximately equal to the difference between the width of the kerfs and the thickness of the spline and is provided with a plurality of generally rectangular, longitudinally extending apertures 50 of slightly greater length and width than the teeth 28 of the spline. The apertures are longitudinally and laterally spaced so as to register with the teeth of the spline and permit the outwardly extending portions thereof to extend through the apertures and contact the sides of the kerfs adjacent the strip.

As shown in FIG. 2 the assembly 46 is initially inserted within the kerfs 18, 20 of the panel members 10, 12 with the teeth of the spline in register with the apertures of the spacer strip. The assembly preferably fills substantially all of the space within the kerfs thereby providing a firmer initial assemblage of the panels and substantially greater resistance to any misaligning sway or other movement of the panels prior to the joint securing operation.

As mentioned the teeth extend through the apertures 50 of the spacer strip so that the cutting tips thereof extend outwardly beyond the flat face 52 of the strip and produce a small groove in the friable panels upon insertion of the assembly 46 into the kerfs. During the securing operation of the joint the spacer strip is maintained in a fixed position relative to the panels while the spline is displaced longitudinally within the kerf. As illustrated in FIG. 3, upon displacement of the spline the cutting tips on each tooth immediately dig into the friable core of the panels carving paths therein in the twisting manner described hereinbefore. At the same time the back surfaces 53 of the tabs 34, partially shown in FIG. 3, contact the stationary top edges 54 of the apertures causing the teeth to cam outwardly from the plane of the spline body, thus assisting in driving the teeth into the core material to a greater extent than would be effectuated by the use of the spline alone. It will be appreciated that the camming action of the top edges also causes the teeth to dig into the core in a more positive manner thereby firmly and securely setting the joint and creating a greater closing force on the panels being joined.

The embodiment of the fastener assembly shown in FIG. 4 may be used for joining three panel members, such as in the joining of a single interior wall to a pair of exterior wall panels. In this embodiment the T-shaped strip 56 acts as a spacer for the aligned exterior panels 10, 12 and as a camming connector for the interior panel 58. As shown, the cross bar 60 of the T-shaped strip 56 extends into the aligned contiguous kerfs 18, 20 of the exterior panels a shorter distance than its associated spline 22. Being substantially narrower in width than the spline it is confined between the rows of outwardly projecting teeth 28 and does not provide the camming action described hereinbefore. However, as will be appreciated the cross bar portion 60 of the spacer strip may be coextensive with the full width of the spline and can, if desired, cooperate with the teeth to produce the joint. The integral flange 64 of the strip 56 protrudes outwardly from the midpoint of the cross bar 60 at substantially a right angle thereto so as to extend into the kerf of the interior panel 58. The free end of the flange 64 is provided with a laterally extending hook 66 having a total thickness approximately equal to the width of the kerf. Adjacent the hook 66 of the flange there is provided a row of camming apertures 68 similar to the apertures 50 of strip 48 for receiving the outwardly projecting teeth of a spline. In the embodiment illustrated in FIG. 4 the assembly is further provided with a half spline 70 positioned in face-to-face relationship with the flange 64 so that the initially inserted edge 26 of the half spline abuts the interior surface 72 of the hook 66 and provides a bearing surface therebetween, anchoring the half spline and the flange within the kerf panel 58. Thus it can be appreciated that the main bearing force of the flange on the spline is by means of the cooperative action of the hook on the surface 26 and not by the action of the sides of the apertures 68 on the single row of teeth 28 in the half spline.

Similar embodiments of the present invention are shown in FIGS. 5, 6, and 7 wherein a spline and hooked flange assembly is used in conjunction with frames for window and door panels, corner sections, and floor, wall and foundation panels. In these embodiments the assembly of FIG. 4 is modified by integrally connecting the hooked spacer flange to different portions of a generally U-shaped frame member. In FIG. 5 the U-shaped member illustrated may provide a frame for door or window panels and is provided with the integral hooked flange 74 extending from the base portion 76 of the U-shaped frame intermediate the two elongated side portions 78. The flange 74 is provided on its free end with a hook 82 which cooperates with the half spline 70 in substantially the same manner as that described with respect to the flange assembly of FIG. 4.

In the embodiments shown in FIGS. 6 and 7 the U-shaped frame member 82 is provided with integral side flanges 84 extending outwardly from the side portions 86 thereof at substantially right angles thereto. The frame of FIG. 6 is particularly useful for joining corner panels or for use at the intersection of wall and floor panels. In this embodiment one of the exterior corner panels or a floor panel is placed within the U-shaped frame 82 and secured therein in a conventional manner such as by the use of the nails 88. The mating corner or wall panel provided with a kerf is then pressed over the flange assemblage and secured thereto by longitudinal displacement of the spline.

It can be seen therefore that the spline fastener of the present invention provides for the quick and facile assemblage of friable panel units into a rigid and sturdy structure in a manner which provides increased strength and durability within the joint. Additionally it provides for inspection of the assembled joint prior to the final setting or securing of the joint, thereby enhancing the smooth aligned appearance of the assembly and at the same time providing for greater coaction between the spline fastener and the panel members.

As will be apparent to persons skilled in the art, various modifications and adaptations of the structure above-described will become readily apparent without departure from the spirit and scope of the invention, the scope of which is defined in the appended claims.

We claim:

1. A spline fastener suitable for use with a friable building member having an elongated slot in the surface to be joined comprising a fastener body insertable in the slot and a plurality of elongated teeth extending longitudinally of the body and offset at an acute angle therefrom for contacting the side of the slot, the teeth being located adjacent side edges of the body and being joined at one end thereof to the body along substantially the entire transverse extent of said tooth with a substantially planar lengthwise portion of each tooth being angularly related along a single substantially straight line to the remainder of the tooth, the angularly related portion extending away from the body the teeth being provided with loading means including an outwardly projecting penetrating tip at the free end thereof coactively engageable with the side of the slot to cooperate with the configuration of the teeth for setting the teeth in the member and in such a manner as to apply a closing force to the member during the joining operation.

2. The fastener of claim 1 wherein the fastener body is made of sheet metal having a thickness less than that of the elongated slot and the teeth are longitudinally spaced on said body, each of the teeth comprising a tooth base offset from the fastener body and a cutting tab as the loading means thereof.

3. The fastener of claim 1 wherein the fastener body is substantially flat, generally rectangular sheet metal and the teeth are longitudinally and laterally spaced along said body, each of the angularly related portions of the teeth being nearer the center line of the body than the remainder of the teeth 4. The fastener of claim 2 wherein the tooth base and cutting tab are disposed at different acute angles to the fastener body.

5. A fastener assembly comprising the fastener of claim 1 in combination with a camming member insertable in the slot of the building member with the fastener and having camming means cooperating with the fastener teeth for camming the teeth away from the fastener body; to assist the spiral setting of the teeth in the building member.

6. The assembly of claim 5 wherein the camming member exhibits at least in part a T-shaped cross-sectional configuration and the fastener body is contiguous with a planar surface thereof along a substantial portion of its length.

7. The assembly of claim 6 wherein the camming member includes an externally visible frame portion.

8. The assembly of claim 5 wherein the camming member is provided with an integral, longitudinally extending hook portion abutting a longitudinal edge of the fastener body.

9. The assembly of claim 5 wherein the camming member is provided with a plurality of apertures juxtaposed to and in register with the teeth of the fastener, a portion of the teeth extending through the apertures for contacting the side of the slot adjacent the camming member.

10. The assembly of claim 5 wherein the camming member is provided with camming surfaces adjacent the teeth of the fastener for assisting in driving the teeth into the building member upon displacement of the fastener during the joining operation.

11. The assembly of claim 5 wherein the camming member is provided with fastener retaining means for maintaining the integrity of the assembly during the joining operation.

References Cited

UNITED STATES PATENTS 3,214,802  11/1965  Davis _____ 287—20.92
3,276,797  10/1966  Humes _____ 287—20.92

FOREIGN PATENTS 97,966  4/1924  Austria.

CARL W. TOMLIN, *Primary Examiner.*

RAMON D. BRITTS, *Assistant Examiner.*